US009646399B2

(12) United States Patent
Jeong et al.

(10) Patent No.: US 9,646,399 B2
(45) Date of Patent: May 9, 2017

(54) METHOD AND APPARATUS FOR IMAGE PROCESSING

(71) Applicant: Samsung Electronics Co., Ltd., Suwon-Si, Gyeonggi-Do (KR)

(72) Inventors: Young Ju Jeong, Yongin-si (KR); Dong Kyung Nam, Yongin-si (KR); Ju Yong Park, Seongnam-si (KR); Yang Ho Cho, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 66 days.

(21) Appl. No.: 14/520,440

(22) Filed: Oct. 22, 2014

(65) Prior Publication Data

US 2015/0125093 A1 May 7, 2015

(30) Foreign Application Priority Data

Nov. 5, 2013 (KR) .................. 10-2013-0133629

(51) Int. Cl.
*G06T 11/60* (2006.01)
*G06T 5/00* (2006.01)
*G06T 15/20* (2011.01)
*G06T 7/00* (2017.01)

(52) U.S. Cl.
CPC .............. *G06T 11/60* (2013.01); *G06T 5/005* (2013.01); *G06T 7/0065* (2013.01); *G06T 15/205* (2013.01); *G06T 2200/21* (2013.01); *G06T 2207/10024* (2013.01); *G06T 2207/10028* (2013.01)

(58) Field of Classification Search
CPC ..... G06T 3/4038; G06T 11/60; H04N 1/3876; H04N 5/23238; G06K 2009/2045
See application file for complete search history.

(56) References Cited

U.S. PATENT DOCUMENTS

| | | | |
|---|---|---|---|
| 2004/0222989 | A1 | 11/2004 | Zhang et al. |
| 2009/0190852 | A1 | 7/2009 | Lim et al. |
| 2011/0064299 | A1 | 3/2011 | Zhang et al. |
| 2011/0205226 | A1 | 8/2011 | Gremse et al. |

FOREIGN PATENT DOCUMENTS

| | | |
|---|---|---|
| JP | 2000215311 A | 8/2000 |
| KR | 20120016439 A | 2/2012 |
| KR | 10-2012-0026662 | 3/2012 |

OTHER PUBLICATIONS

C. Zitnick, "High-quality video view interpolation using a layered representation", 9pgs, Interactive Visual Media Group, Microsoft Research, Redmond, WA, 2004.

(Continued)

*Primary Examiner* — Duy M Dang
(74) *Attorney, Agent, or Firm* — Harness, Dickey & Pierce, P.L.C.

(57) ABSTRACT

A method and apparatus for image processing is provided, in which the method for image processing includes generating a base image based on multi-view color images and depth images corresponding to the multi-view color images, and generating a light field (LF) image, for example, an output image, based on the base image, that is, an image including occlusion regions of at least one LF image to be generated based on color images and depth images.

18 Claims, 46 Drawing Sheets

(56) References Cited

OTHER PUBLICATIONS

E. Lee, "High-qualtiy 3-D Video Generation using Scale Space", HCI2009, 5pgs, 2009.
European Search Report issued on Mar. 23, 2015 for EP Application No. 14189968.1.
Tauber, Zinovi, et al., "Review and Preview: Disocclusion by Inpainting for Image-Based Rendering", IEEE Transactions on Systems, Man, and Cybernetics—Part C: Applications and Reviews, vol. 37 No. 4, Jul. 2007 pp. 527-540.
Zhang, Cha, et al., "Spectral Analysis for Sampling Image-Based Rendering Data", IEEE Transactions on Circuits and Systems for Video Technology, vol. 13, No. 11, Nov. 2003, pp. 1038-1050.
Tian, Dong, et al., "View Synthesis Techniques for 3D Video", Applications of Digital Image Processing XXXII, Proc. of SPIE vol. 7443, 2009, pp. 74430T-1-74430T-11.

First input color image

First input depth image

Second input color image

Second input depth image

Third input color image

Third input depth image

First color image with
converted viewpoint

First depth image with
converted viewpoint

Second color image with
converted viewpoint

Second depth image with
converted viewpoint

Third color image with
converted viewpoint

Third depth image with
converted viewpoint

First base color image

First base depth image

Second base color image

Second base depth image

Third base color image

Third base depth image

LF depth map image

First base image

Second base image

LF image generated based on first base image

LF image generated based on
second base image

First base image

LF image generated based on first base image

Second base image

LF image generated based on
second base image

METHOD AND APPARATUS FOR IMAGE PROCESSING

CROSS-REFERENCE TO RELATED APPLICATION

This application claims the priority benefit of Korean Patent Application No. 10-2013-0133629, filed on Nov. 5, 2013, in the Korean Intellectual Property Office, the disclosure of which is incorporated herein by reference.

BACKGROUND

1. Field

Example embodiments relate to a method and apparatus for image processing, and more particularly, to a method and apparatus for processing a light field (LF) image.

2. Description of the Related Art

To generate a light field (LF) display when multi-view images are input, an LF image that includes a viewpoint may be generated by converting the multi-view images.

An image based rendering (IBR) method may be used to generate the LF image from the multi-view images. To apply the IBR method, multiple multi-view images, or multiple images generated based on the multi-view images and depth map images corresponding to the multi-view images are employed.

An occlusion region of the LF image may exist, which is a region of the LF image where information is not provided by the input multi-view images. Therefore, data in the occlusion region may need to be restored.

Also, a substantial amount of memory is required to generate the LF image. In particular, to generate a natural LF image, appropriate processing of the occlusion region may be required. When the processing of the occlusion region is omitted, distortion may occur within the LF image.

SUMMARY

The foregoing and/or other aspects are achieved by providing a method for image processing, the method including generating a base image based on multi-view color images and depth images corresponding to the multi-view color images, the base image including occlusion regions, restoring one or more of the occlusion regions in the base image, and generating an output image based on the base image with the restored occlusion region.

The occlusion regions may correspond to all occlusion regions of the at least one image.

The base image may be determined based on an inclusion relationship of the occlusion regions.

The base image may be an image in which, aside from a single image including an occlusion region of the base image, another image including the occlusion region absent from among at least one image to be generated based on the multi-view color images and the depth images.

The generating a base image includes generating a plurality of base images.

The plurality of base images corresponds to at least a far left image and a far right image amongst the at least one image.

The base image may be selected based on directions of rays of the output image.

The base image may be an image in which a direction of a ray deviates most from among the at least one image.

The generating a base image may include determining a position of the base image based on the occlusion regions, and generating the base image of the determined position based on the multi-view color images and the depth images.

The generating a base image includes determining a position of an image having a greatest quantity of information about an occlusion region from among images to be generated based on the multi-view color images and the depth images, and generating a based image of the determined position based on the multi-view color images and the depth images.

The generating a base image may include generating converted images by converting the multi-view color images and the depth images into an image of a viewpoint at the determined position, and generating the base image of the determined position by combining the converted images.

The method may further include selecting a pixel based on a depth value, from among pixels of the converted images, and wherein the generating a base images generates the base image using data from the selected pixel as data for a plurality of pixels.

Data of a pixel having a greatest depth value from among pixels of the images of which the plurality of viewpoints is converted corresponding to a plurality of pixels of the base image, is used for the plurality of pixels.

The restoring of the occlusion region in the base image may include detecting the occlusion region in the base image, generating at least one depth layer with respect to the base image based on a base depth image, the base depth image representing a depth of the base image, and restoring the occlusion region based on one of the at least one depth layer that is adjacent to the occlusion region.

A plurality of depth layers adjacent to the occlusion region may be generated.

The restoring may restore the occlusion region based on one of the at least one depth layers from among the plurality of adjacent depth layers.

The occlusion region may be restored through texture synthesis with respect to the depth layer in which the occlusion region is included.

The generating a base image may include generating a plurality of base images.

The plurality of base images may include a main base image used for generating the output image.

The main base image may be a base image selected based on a size of the occlusion region from among the plurality of base images.

The main base image may be a base image including a greatest occlusion region from among the plurality of base images.

The main base image may be a base image selected from among the plurality of base images based on a distance from a light source.

The main base image may be a base image closest to the light source from among the plurality of base images.

The main base image may be a base image selected from among the plurality of base images based on a second angle and a first angle.

The main base image may be a base image having the first angle closest to the second angle from among the plurality of base images.

The first angle may be an angle of an inclination of the base image.

The second angle may be an angle between a normal vector of a display via which the output image is output and a ray.

The generating an output image may include determining the main base image, generating the output image based on the determined main base image, and rendering an occlusion region in the output image based on ones of the plurality of base images other than the main base image.

The output image may be an LF image.

The output image may be generated through applying view interpolation to the main base image.

The foregoing and/or other aspects are achieved by providing an image processing apparatus including a processor, the processor including a base image generator configured to generate a base image based on multi-view color images and depth images corresponding to the multi-view color images, the base image including occlusion regions, an occlusion region restorer configured to restore an occlusion region in the base image, and an output image generator configured to generate an output image based on the base image in which the occlusion region is restored.

The occlusion regions may be all occlusion regions of the at least one image.

At least one example embodiment relates to a method of generating light field (LF) images using a processor, the LF images being four-dimensional images.

In at least one embodiment, the method includes combining a plurality of input images into a light field (LF) base image based on a depth image, the LF base image having at least one occlusion region absent pixel values therein; detecting the at least one occlusion region associated with the LF base image; forming a restored LF base image by restoring the pixel values in the occlusion region of the LF base image based on a depth of the occlusion region; and shifting pixels in the restored LF base image to generate the LF images.

In at least one embodiment, the pixel values that absent from the at least one occlusion region include at least one of a color value and a depth value of pixels therein, and the restoring the pixel values in the occlusion region comprises: estimating the pixel values in the occlusion region by performing texture synthesis to expand pixel values of pixels adjacent to and at a same depth as the occlusion region.

In at least one embodiment, the method further includes capturing, via an image sensor, the plurality of input images; and capturing, via a depth sensor, the depth image.

In at least one embodiment, the four-dimensional LF images include information on color, intensity and direction of image data therein.

In at least one embodiment, the combining combines the plurality of input images into a plurality of LF base images, and the depth of the occlusion region is determined based on the plurality of LF base images.

In at least one embodiment, the forming the restored LF base image includes selecting one of the plurality of LF base images having a relatively largest quantity of pixel values in the occlusion region.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 11A illustrates a first input color image according to some example embodiments;

FIG. 11B illustrates a first input depth image according to some example embodiments;

FIG. 11C illustrates a second input color image according to some example embodiments;

FIG. 11D illustrates a second input depth image according to some example embodiments:

FIG. 11E illustrates a third input color image according to some example embodiments;

FIG. 11F illustrates a third input depth image according to some example embodiments;

FIG. 12A illustrates a first color image with a converted viewpoint according to some example embodiments;

FIG. 12B illustrates a first depth image with a converted viewpoint according to some example embodiments;

FIG. 12C illustrates a second color image with a converted viewpoint according to some example embodiments;

FIG. 12D illustrates a second depth image with a converted viewpoint according to some example embodiments;

FIG. 12E illustrates a third color image with a converted viewpoint according to some example embodiments:

FIG. 12F illustrates a third depth image with a converted viewpoint according to some example embodiments;

FIG. 13A illustrates a first base color image according to some example embodiments;

FIG. 13B illustrates a first base depth image according to some example embodiments;

FIG. 13C illustrates a second base color image according to some example embodiments;

FIG. 13D illustrates a second base depth image according to some example embodiments;

FIG. 13E illustrates a third base color image according to some example embodiments;

FIG. 13F illustrates a third base depth image according to some example embodiments;

DETAILED DESCRIPTION

Figure 1:
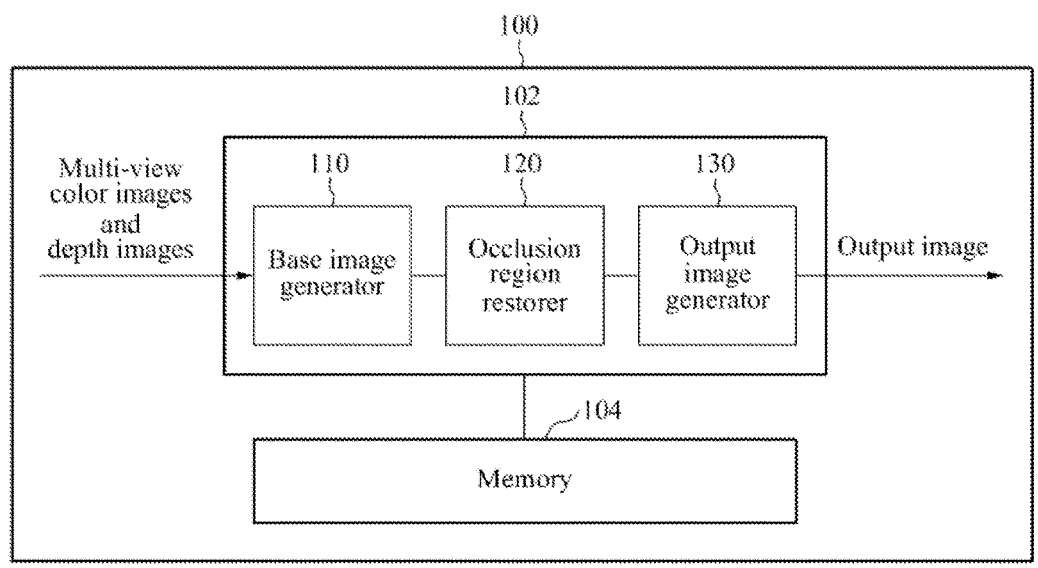
FIG. 1 illustrates an apparatus for image processing according to some example embodiments.

Reference will now be made in detail to example embodiments, examples of which are illustrated in the accompanying drawings, wherein like reference numerals refer to like elements throughout. Example embodiments are described below with reference to the figures.

A view includes a color image captured by a camera and a depth image captured by a depth camera. A viewpoint of the view refers to a position, and a direction of a point at which an object is to be captured with respect to the object to be captured, for example, a scene. Also, the viewpoint refers to a direction or a position of capturing. Viewpoints of a plurality of views refer to relative directions, and relative positions amongst the plurality of views.

As used herein, a "color image" may refer to an image representing color values of pixels in the image. Also, the color image may refer to information or data of the color image.

For example, the color image may include the color values of the pixels in the color image. The color values of the pixels of the color image indicate a color of an object within a scene represented by the pixel within the color image generated by capturing.

As used herein, a "depth image" may refer to an image representing depth values of pixels in the image. Also, the depth image may refer to information or data of the depth image. The terms "depth image" and "depth map image" are construed to be identical, and thus may be used interchangeably.

For example, the depth image includes the depth values within the depth image. The depth values of the pixel of the depth image indicate a depth of an object, a point, or a region within a scene represented by a pixel in the depth image generated by capturing the scene. By way of example, a small depth value may indicate that an object, a point, or a region represented by a pixel is remote from a point of capture, and a large depth value may indicates an object, a point, or a region represented by a pixel is close to a point of capture. Conversely, a large depth value may indicate an object, a point, or a region represented by a pixel is remote from a point of capture, and a small depth value indicates an object, a point, or a region represented by a pixel is close to a point of capture.

When a scene is captured at a point by a camera and a depth camera, a color value and a depth value are generated with respect to a pixel corresponding to a desired (or alternatively, a predetermined) point or a region within the scene. The generated color value of the pixel refers to a color value of the desired (or alternatively, the predetermined) point, and the generated depth value of the pixel refers to a distance between the desired (or alternatively, the predetermined) point and the point of capture. The color image includes generated color values of pixels, and the depth image includes generated depth values of pixels.

A pixel of the color image and a pixel of the depth image have a corresponding relationship. When the pixel of the color image and the pixel of the depth image correspond, an indication is given that both of the pixels of the color image and the depth image indicate an identical object, point, or region within a scene. The pixels of the color image and the depth image having identical coordinate values within the color image and the depth image correspond to each other.

FIG. 1 illustrates an apparatus 100 for image processing according to some example embodiments.

Referring to FIG. 1, the apparatus 100 for image processing includes a processor 102 and a memory 104.

The processor 102 may be configured to carry out instructions of a computer program by performing the arithmetical, logical, and input/output operations. The processor may read the instructions from the memory 104 via a bus and/or a network interface. The instructions, when executed by the processor 102, configure the processor as a base image generator 110, an occlusion region restorer 120, and an output image generator 130. Functions of the base image generator 110, the occlusion region restorer 120, and the output image generator 130 will be described later with reference to FIG. 2 and other pertinent drawings.

The memory 104 may be a computer readable storage medium. The memory 104 may include a random access memory (RAM), read only memory (ROM), and/or a permanent mass storage device, such as a disk drive. The processor 100 may be a logic chip, for example, a central processing unit (CPU), a controller, or an application-specific integrated circuit (ASIC), that when, executing the instructions stored in the memory 104, is configured as a special purpose machine acting as the base image generator 110, the occlusion region restorer 120, and the output image generator 130.

Figure 2:
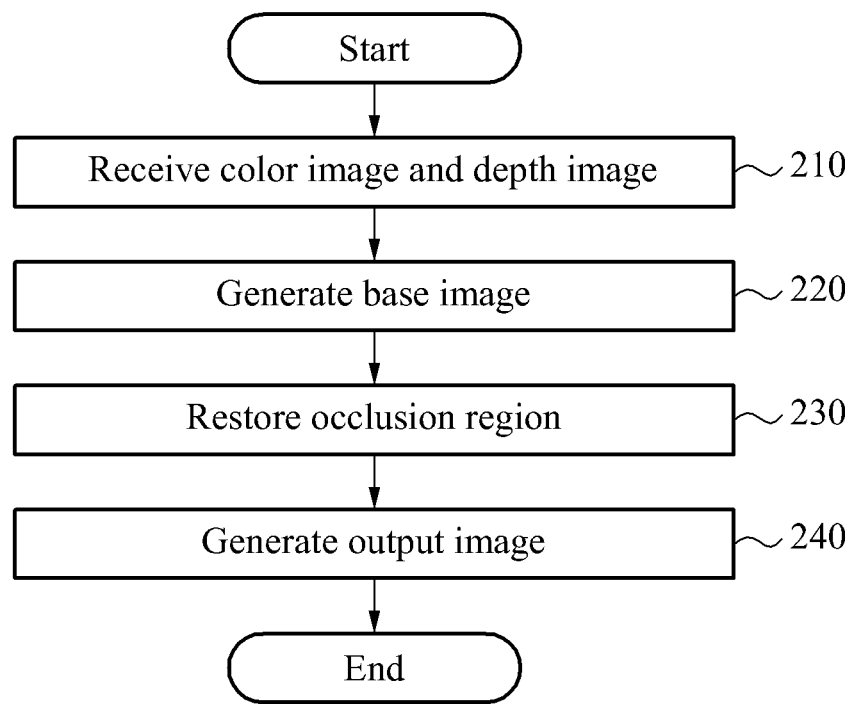
FIG. 2 illustrates a method of image processing according to some example embodiments.

FIG. 2 illustrates a method for image processing according to some example embodiments.

Referring to FIG. 2, in operation 210, the base image generator 110 receives multi-view color images and depth images corresponding to the multi-view color images. The multi-view color images refer to a plurality of color images having differing viewpoints. The viewpoints may correspond to differing positions on a single baseline. The depth images may be depth images corresponding to the plurality of color images. As an example, a view at a viewpoint may include a color image and a depth image at the viewpoint. Also, the base image generator 110 receives a base position.

The multi-view color images and the depth images will be described later with reference to FIGS. 11A through 11F.

In operation 220, the base image generator 110 generates a base image based on the multi-view color images and the depth images corresponding to the multi-view color images.

The base image refers to an image including occlusion regions of at least one light field (LF) image to be generated based on the multi-view color images and the depth images. Alternatively, the base image refers to an image including all occlusion regions of the at least one LF image to be generated based on the multi-view color images and the depth images.

Also, the base image refers to an image in which, aside from a single LF image including an occlusion region of the base image, another LF image including the occlusion region absent from the at least one LF image to be generated based on the color images and the depth images. As an example, the base image is determined based on an inclusion relationship of the occlusion regions of the at least one LF image to be generated based on the color images and the depth images.

Further, the base image refers to an image in which all or a portion of the occlusion region is restored from among the color images and the depth images having the differing viewpoints to be generated based on the multi-view color images and the depth images. The base image includes a base color image and a base depth image corresponding to a depth image of the base color image. The base color image indicates a color of the base image. The base depth image indicates a depth of the base image.

In operation 230, the occlusion region restorer 120 restores the occlusion region within the generated base image.

The occlusion region refers to a region of which a color value or a depth value is unknown. The color image and the depth image include two-dimensional (2D) information. Accordingly, when a viewpoint of the color image and the depth image changes a portion of a foreground or a background, occluded by a foreground within a scene, may be displayed. However, the color image and the depth image may not include information about the occluded portion, for example, a color value and a depth value of the occluded portion. Thus, the occluded portion may be represented as an occlusion region within the color image and the depth image generated by the change of the viewpoint.

In operation 240, the output image generator 130 generates an output image based on the base image of which the occlusion region is restored.

The output image refers to an image having a viewpoint differing from viewpoints of the color images and the depth images. The output image may be a color image. Also, the output image includes an output color image and an output depth image.

The output image may be a light field (LF) image. As an example, a viewpoint of the output image may be a viewpoint differing in vertical and horizontal directions when compared to viewpoints of the input multi-view color images and the depth images. The vertical and the horizontal direction refer to directions with respect to a scene represented by the multi-view color images and the depth images.

The output image generator 130 generates an output image by applying interpolation to the plurality of generated base images. The output generator 130 outputs the generated output image.

The output generator 130 may be a projector. The output generator 130 is an internal constituent of the apparatus 100 for image processing, and an external constituent connected, via a cable or a network, with the apparatus 100 for image processing.

Figure 3:
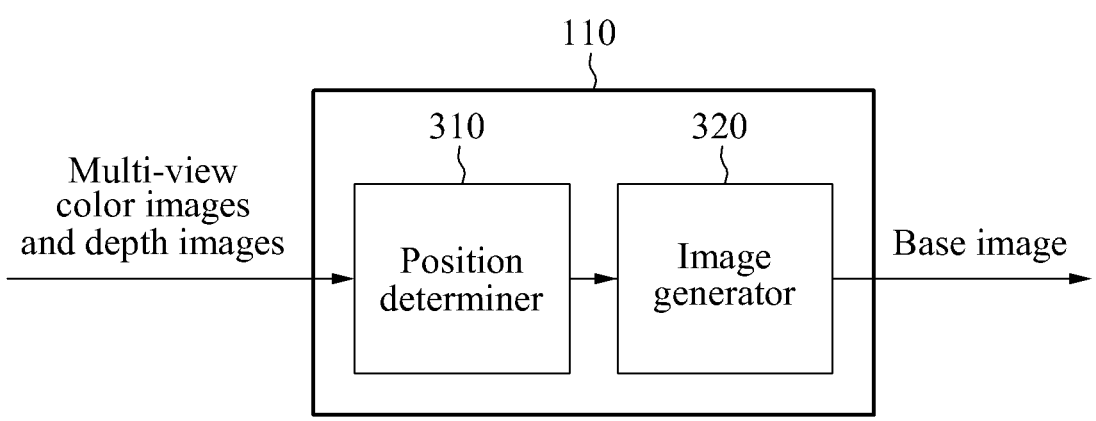
FIG. 3 illustrates a base image generator according to some example embodiments.

FIG. 3 illustrates a base image generator 110 according to some example embodiments.

Referring to FIG. 3, the base image generator 110 includes a position determiner 310 and an image generator 320.

The position determiner 310 and the image generator 320 will be described with reference to FIG. 4.

Figure 4:
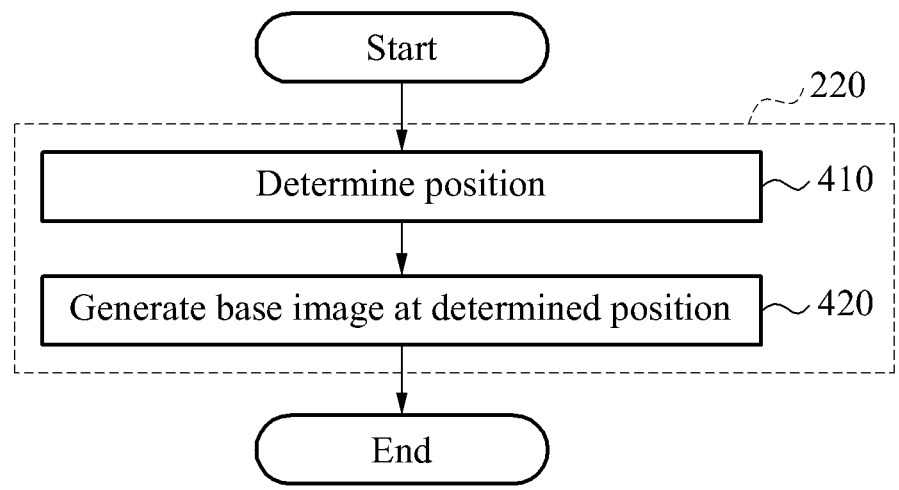
FIG. 4 illustrates a method of generating a base image according to some example embodiments.

FIG. 4 illustrates a method of generating a base image according to some example embodiments.

Referring to FIGS. 2 to 4, the generation of the base image described in operation 220 of FIG. 2 may include operations 410 and 420.

In operation 410, the position determiner 310 determines a position of a base image. The position of the base image indicates a viewpoint of the base image. As used herein, a "position of a base image, or an image" is interchangeable with a "viewpoint of a base image, or an image".

The position determiner 310 determines the position of the base image as at least one position from among positions of images generated by the apparatus 100 for image processing. For example, the position determiner 310 determines a base image from among the images generated by the apparatus 100 for image processing, and determines a position of the determined image to be a position of the base image.

The position determiner 310 determines a position of an image having a greatest quantity of occlusion information to be a position of the base image from among the images to be generated by the apparatus 100 for image processing based on input color images and depth images corresponding to the color images. As an example, the position determiner 310 determines a position of the base image based on occlusion regions of the images to be generated by the apparatus 100 for image processing based on the input color image and the depth images corresponding to the color images.

The occlusion information refers to information about an occlusion region. An image having a great quantity of occlusion information refers to an image including a greatest occlusion region.

The position determiner 310 selects positions at both ends from among a plurality of positions to be a position of a base image. A plurality of base images may be a far left LF image and a far right LF image from among at least one image to be generated based on multi-view color images and depth images corresponding to the multi-view color images.

In determining the position of the base image, the position determiner 310 account for a rotation of the output generator 130 that outputs an output image.

The position determiner 310 may select, to be a position of the base image, positions of images in which a direction of a ray deviates most from among positions. A number of the images of which the direction of the ray deviates most may be two. As an example, the base image may be an image in which a direction of a ray deviates most from among at least one image to be generated based on multi-view color images and depth images corresponding to the multi-view color images. As an example, the base image is selected based on directions of a ray of at least one image to be generated based on multi-view color images and depth images corresponding to the multi-view color images.

The base image may be obtained by imaging perspective lights having an identical light source into a single group. Alternatively, the base image may be obtained by imaging orthographic lights having an identical light direction and differing light sources into a single group.

The images to be generated by the apparatus 100 for image processing described in the preceding may be LF images. The images to be generated by the apparatus 100 for image processing are determined by multi-view color images and depth images. As an example, the position determiner 310 determines at least one position of the images to be generated based on the multi-view color images and the depth images to be the position of the base image.

In operation 420, the image generator 320 generates the base image of the determined position based on the multi-view color images and the depth images corresponding to the multi-view color images. The generated base image may be an LF image. The generation of the base image will be discussed with reference to FIGS. 5 and 6.

Figure 5:
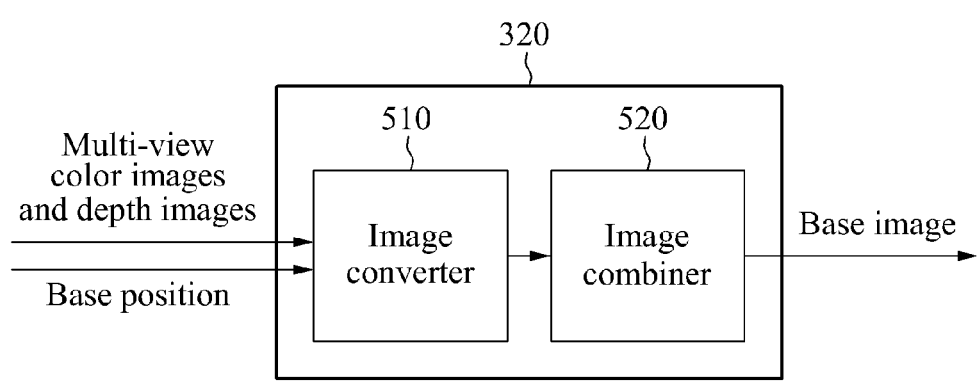
FIG. 5 illustrates an image combiner according to some example embodiments.
Figure 6:
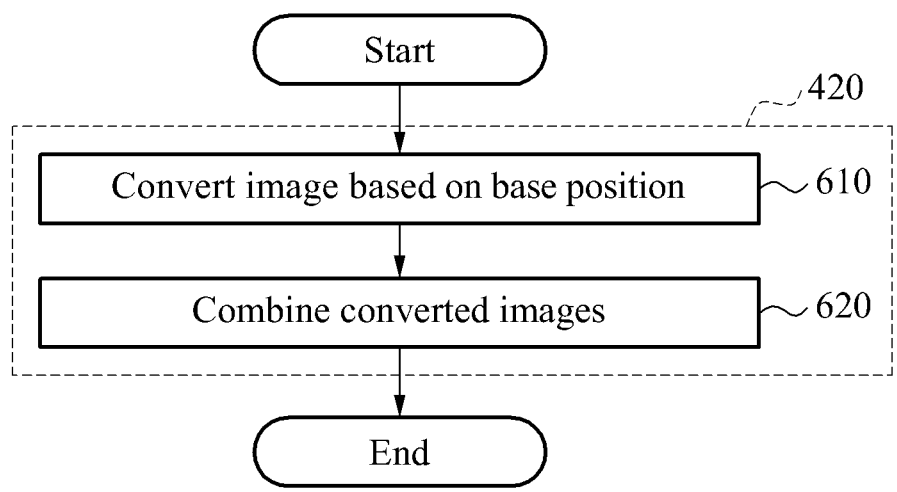
FIG. 6 illustrates a method of combining an image according to some example embodiments.

FIG. 5 illustrates an image combiner 320 according to some example embodiments. FIG. 6 illustrates a method of combining an image to generate a base image according to some example embodiments.

Referring to FIGS. 3 to 6, the image combiner 320 of FIG. 3 may include an image converter 510 and an image combiner 520.

In operation 610, the image converter 510 generates an image with a converted viewpoint by converting a color image and a depth image corresponding to the color image into an image at a viewpoint at the position determined in operation 410. The image with the converted viewpoint includes the color image and the depth image having the viewpoint of the determined position. As an example, the image with the converted viewpoint includes the color image the converted viewpoint and the depth image with the converted viewpoint. A plurality of images with converted viewpoints includes differing information in terms of a color and a depth.

With respect to multi-view color images and depth images corresponding to the multi-view color images, the image converter 510 converts each of the color images and each of the depth images corresponding to the multi-view color images into the image at the viewpoint at the position determined in operation 410, and generates a plurality of images of which a viewpoint is converted into the viewpoint at the determined position. The viewpoint at the determined position may be a viewpoint of the base image.

For a case in which three multi-view color images and three depth images are input, three color images and depth images with converted viewpoints will be described later with reference to FIGS. 12A through 12F.

In operation 620, the image combiner 520 combines the plurality of images with the converted viewpoints, and generates a combined base image at the position determined in operation 410. The combining of the plurality of images with the converted viewpoints may refer to integrating information of the plurality of images with the converted viewpoints.

The plurality of images with the converted viewpoints includes differing occlusion regions. The image combiner 520 selects a closest object from among the plurality of images with the converted viewpoints when combining the plurality of images with the converted viewpoints. The image combiner 520 uses data of a pixel having a greatest depth value with respect to the plurality of pixels of the base image, from among the plurality of pixels of the plurality of images with the converted viewpoints corresponding to the plurality of pixels. As an example, the image combiner 520 uses the data of the pixel selected based on the depth value with respect to the plurality of pixels, from among the plurality of pixels of the plurality of images with the converted viewpoints corresponding to the plurality of pixels.

As an example, the image combiner 520 determines a closest pixel to be a color value of a first pixel of a base image from among second pixels of the plurality of images with the converted viewpoints corresponding to the plurality of pixels. The image combiner 520 uses depth images with converted viewpoints to determine the closest pixel from among the second pixels. The image combiner 520 sets a color value of the determined closest pixel to be a color value of a pixel of the base image, or a base color image. By way of example, the image combiner 520 sets the color value of the closest pixel to be the color value of the pixel of the position of the base image, or the base color image, from among pixels at an identical position of color images with converted viewpoints.

As an example, the image combiner 520 determines the closest pixel to be a depth value of the first pixel of the base image from among the second pixels of the plurality of images with the converted viewpoints corresponding to the plurality of pixels. The image combiner 520 uses depth images with converted viewpoints to determine the closest pixel from among the second pixels. The image combiner 520 sets the depth value of the determined closest pixel to be the depth value of the pixel of the base image, or the base color image. By way of example, the image combiner 520 sets the depth value of the closest pixel to be the depth value of the pixel at the position of the base image, or the base color image, from among pixels at an identical position of the depth images with the converted viewpoints.

As an example, the image combiner 520 selects a most protruding object from among the plurality of images with the converted viewpoints when combining the plurality of images with the converted viewpoints. The most protruding object refers to an object closest from a viewpoint of a viewer. Also, the most protruding object refers to an object of which a depth is least or greatest.

Three base images having differing viewpoints generated by the combining will be described later with reference to FIGS. 13A through 13F.

Figure 7:
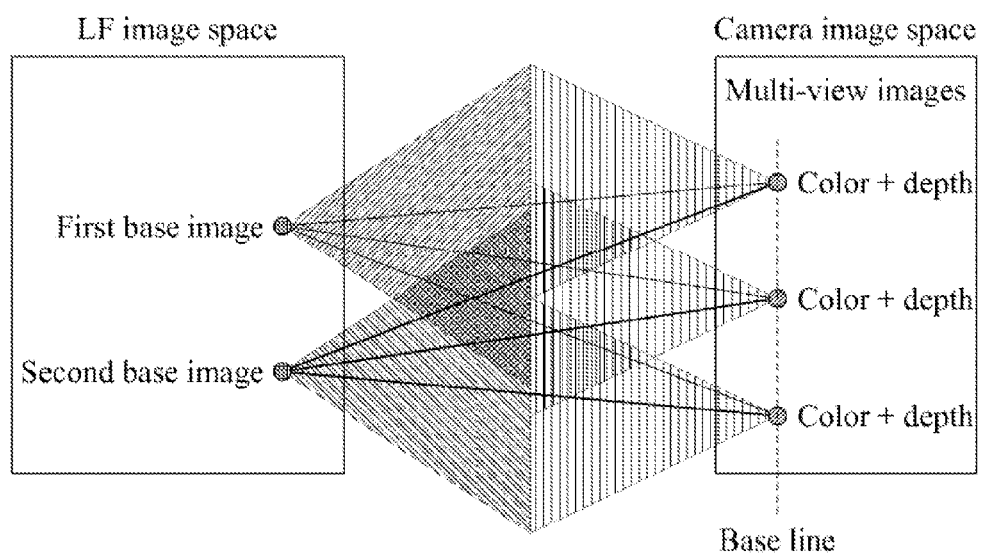
FIG. 7 illustrates a method of generating a base image with respect to a perspective light field (LF) according to some example embodiments.

FIG. 7 illustrates a method of generating a base image with respect to a perspective LF according to some example embodiments.

Multi-view images in a camera image space are illustrated on a right-hand side of FIG. 7. Three input images are illustrated in a form of a triangle starting from a plurality of points as the multi-view images. Viewpoints of the three input images may be differing viewpoints on a baseline. Each of the input images includes a color image and a depth image.

A plurality of base images in an LF image space is illustrated on a left-hand side of FIG. 7. A first base image and a second base image are illustrated in a form of a triangle starting from a plurality of points as the plurality of base images. The triangle indicates a light source of an image.

A line between a point indicating an input image, hereinafter referred to as an input image point, and a point indicating a base image, hereinafter referred to as a base image point, indicates a dependence relationship between the input image and the base image. The line between the input image point and the base image point indicates that the input image is used for generation of the base image.

The triangle starting from the input image point or the base image point indicates a space represented by the input image and the base image.

A plurality of input images may be images obtained by a perspective projection. A perspective projection is a projection on a surface as though seen through a single point. Also, the plurality of base images is generated by the perspective projection.

Figure 8:
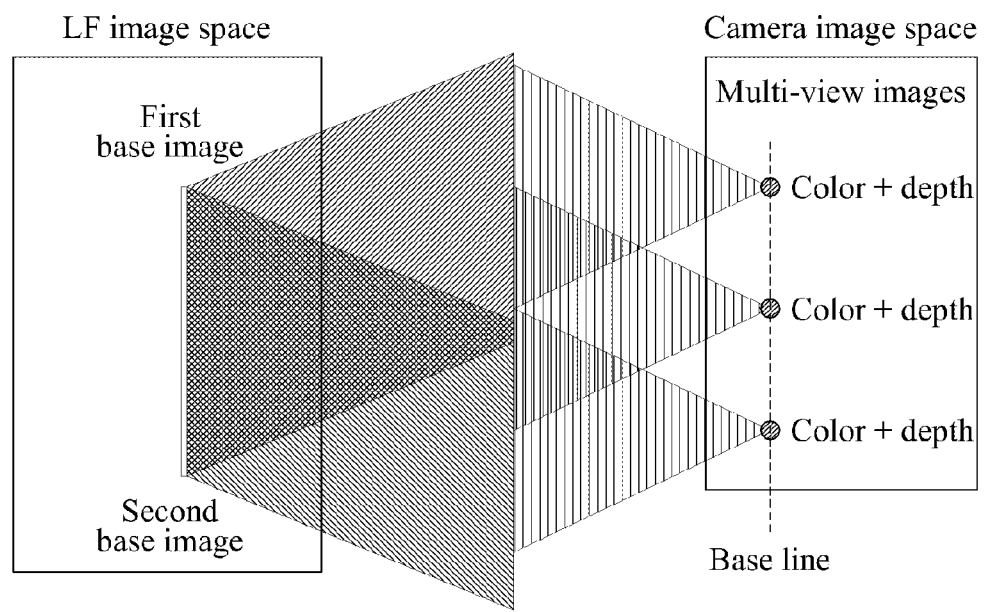
FIG. 8 illustrates a method of generating a base image with respect to an orthographic LF according to some example embodiments.

FIG. 8 illustrates a method of generating a base image with respect to an orthographic LF according to some example embodiments.

Multi-view images in a camera image space are illustrated on a right-hand side of FIG. 8. Three input images are illustrated in a form of a triangle starting from a plurality of points as the multi-view images. Viewpoints of the three input images are differing viewpoints on a baseline. Each of the input images includes a color image and a depth image.

A plurality of base images in an LF image space is illustrated on a left-hand side of FIG. 8. A first base image and a second base image are each illustrated in a form of a face of a parallelogram as the plurality of base images. A perpendicular face on a left side of the first base image and the second base image represents a line of light sources in parallel.

A plurality of input images may be images obtained by a perspective projection. Also, the plurality of base images is generated by an orthographic projection. An orthographic projection projects a three-dimensional object in two dimensions, where all the projection lines are orthogonal to the projection plane.

Figure 9:
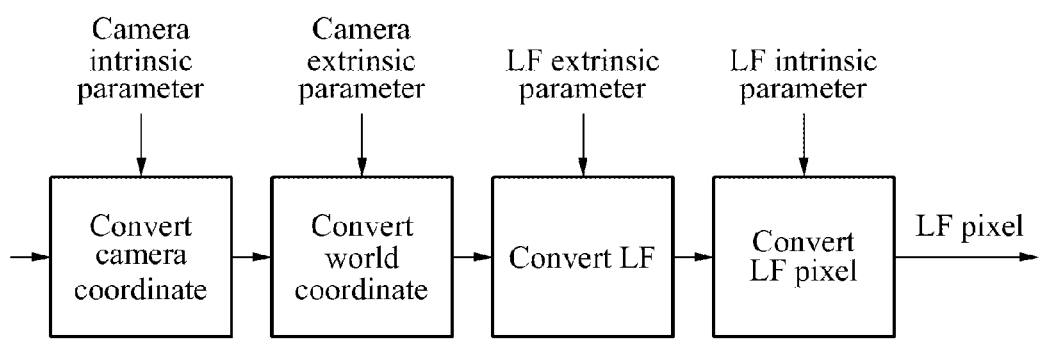
FIG. 9 illustrates a method of calculating an LF pixel according to some example embodiments.

FIG. 9 illustrates a method of calculating an LF pixel according to some example embodiments.

Referring to FIGS. 5 and 9, the image converter 510 converts a pixel or a coordinate of a pixel of an input image into a camera coordinate based on a camera intrinsic parameter. The conversion into the camera coordinate will be described later with reference to FIG. 10A.

The image converter 510 converts the camera coordinate into a world coordinate based on a camera extrinsic parameter. The conversion into the world coordinate will be described later with reference to FIG. 10B.

The image converter 510 converts the world coordinate into an LF coordinate based on an LF extrinsic parameter. The conversion into the LF coordinate will be described later with reference to FIG. 10C.

The image converter 510 converts the LF coordinate into an LF pixel. The image converter 510 determines a pixel corresponding to a calculated LF coordinate from among pixels within an LF image.

The image converter 510 maps the calculated LF coordinate to a desired (or alternatively, a predetermined) coordinate within the LF image through the orthographic projection or the perspective projection based on a type of an LF. Alternatively, the image converter 510 maps the calculated LF coordinate to a single pixel from among the pixels within the LF image through the orthographic projection or the perspective projection based on the type of the LF. An LF pixel with the LF image is generated by the mapping.

Figure 10A:
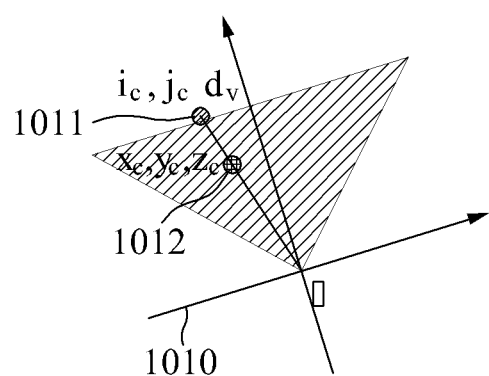
FIG. 10A illustrates conversion into a camera coordinate according to some example embodiments.

The mapping to the pixel based on the orthographic projection or the perspective projection will be described later with reference to FIGS. 10D and 10E. FIG. 10A illustrates conversion into a camera coordinate according to some example embodiments.

Referring to FIG. 10A, a pixel 1011 at a position $(i_c, j_j, dij)$ with in an input image is converted into a coordinate 1012 $(x_c, y_c, z_c)$ in a camera coordinate system 1010.

"$i_c, j_j, dij$" in the position $(i_c, j_j, dij)$ within the input image each denotes a horizontal position of a pixel, a vertical position of a pixel, and a depth of a pixel.

A triangle as shown in FIG. 10A corresponds to a region of an input image.

Figure 10B:
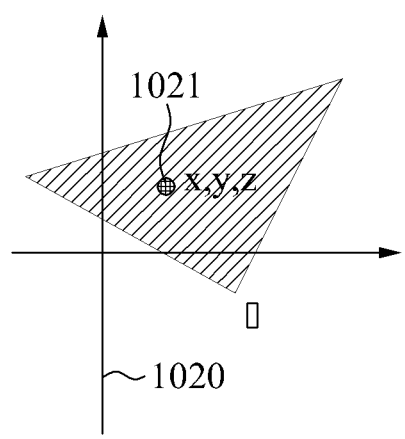
FIG. 10B illustrates conversion into a world coordinate according to some example embodiments.

FIG. 10B illustrates conversion into a world coordinate according to some example embodiments.

Referring to FIG. 10B, the coordinate 1012 $(x_c, y_c, z_c)$ of the camera coordinate system 1010 is converted into a coordinate 1021 $(x, y, z)$ in a world coordinate system 1020.

A triangle as shown in FIG. 10B corresponds to a region of an input image.

Figure 10C:
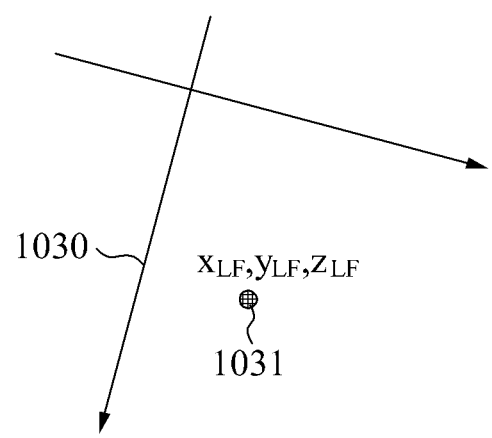
FIG. 10C illustrates conversion into an LF coordinate according to some example embodiments.

FIG. 10C illustrates conversion into an LF coordinate according to some example embodiments.

Referring to FIG. 10C, the coordinate 1021 $(x, y, z)$ in the world coordinate 1020 is converted into a coordinate 1031 $(x_{LF}, y_{LF}, z_{LF})$ in an LF coordinate system 1030.

Figure 10D:
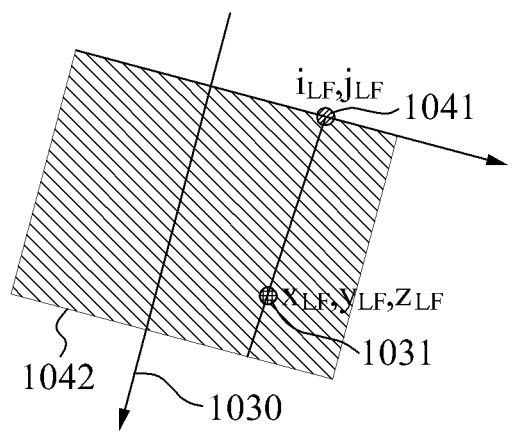
FIG. 10D illustrates pixel mapping based on an orthographic projection according to some example embodiments.

FIG. 10D illustrates pixel mapping based on an orthographic projection according to some example embodiments.

Referring to FIG. 10D, the coordinate 1031 $(x_{LF}, y_{LF}, z_{LF})$ in the LF coordinate system 1030 is mapped to a pixel 1041 at a position $(i_{LF}, j_{LF})$ within an LF image by an orthographic projection.

"$i_{LF}$ and $j_{LF}$" in the position $(i_{LF}, j_{LF})$ within the input image each denotes a horizontal position of a pixel and a vertical position of a pixel.

A square 1042 as shown in FIG. 10D corresponds to a region of a base image.

Figure 10E:
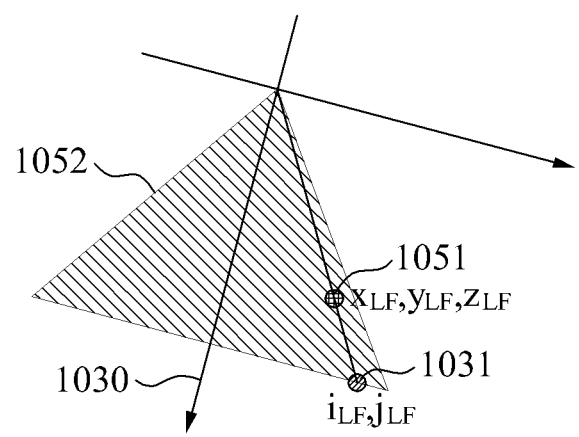
FIG. 10E illustrates pixel mapping based on a perspective projection according to some example embodiments.

FIG. 10E illustrates pixel mapping based on perspective projection according to some example embodiments.

Referring to FIG. 10E, a coordinate 1051 $(x_{LF}, y_{LF}, z_{LF})$ in the LF coordinate system 1030 is mapped to a pixel 1031 at a position $(i_{LF}, j_{LF})$ within an LF image by perspective projection.

"$i_{LF}$ and $j_{LF}$" in the position $(i_{LF}, j_{LF})$ within the input image each denotes a horizontal position of a pixel and a vertical position of a pixel.

A triangle 1052 as shown in FIG. 10E corresponds to a region of a base image.

FIGS. 11A through 11F illustrate three input color images and three depth images according to some example embodiments.

Referring to FIGS. 11A through 11F, multi-view color images include a first input color image, a second input color image, and a third input color image, and multi-view depth images include a first input depth image, a second input depth image, and a third input depth image.

The first input color image and the first input depth image configure a first view or a first input image. The second input color image and the second input depth image configure a second view or a second input image. The third input color image and the third input depth image configure a third view or a third input image.

Referring to FIGS. 11A through 11F, an object in a foreground is illustrated to be provided in a form of a circular or spherical shape. A background is illustrated in black.

Figure 11A:
FIGS. 11A through 11F illustrate three input color images and three depth images according to some example embodiments.

FIG. 11A illustrates the first input color image according to some example embodiments.

Referring to FIG. 11A, the first input color image is a color image at a left viewpoint or a far left viewpoint from among the multi-view color images.

In the first input color image, circular objects in the foreground are illustrated to be leaning toward a right side. The greater a depth value of the objects in the foreground or the closer to a point of capture, the closer the objects in the foreground to the right side.

Figure 11B:
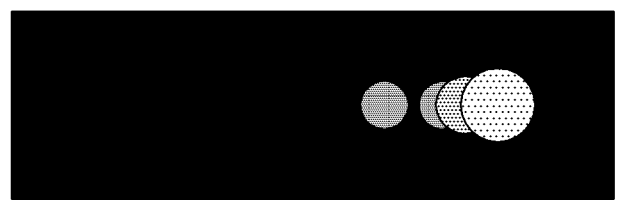

FIG. 11B illustrates the first input depth image according to some example embodiments.

Referring to FIG. 11B, the first input depth image is a depth image corresponding to the first input color image. The first input depth image is a depth image at a left viewpoint or a far left viewpoint from among the multi-view depth images.

In the first depth image, a light colored portion indicates a portion having a great depth value or a portion closer to the point of capture. A relatively darker colored portion indicates a portion having a small depth value or a portion more remote from the point of capture.

Figure 11C:
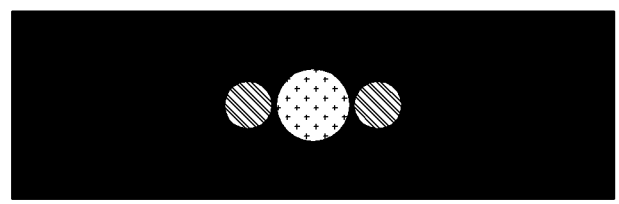

FIG. 11C illustrates the second input color image according to some example embodiments.

Referring to FIG. 11C, the first input color image is a color image at a central viewpoint from among the multi-view color images.

In the first color image, circular objects in the foreground are illustrated to be at a center of the color image. An object having a smaller depth value, for example, an object more remote from a point of capture, from among the objects in the foreground is occluded by an object having a greater depth value, for example, an object closer to the point of capture.

Figure 11D:
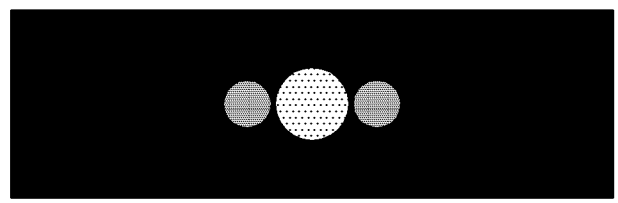

FIG. 11D illustrates the second input depth image according to some example embodiments.

Referring to FIG. 11D, the second input depth image is a depth image corresponding to the second input color image. The second input depth image is a depth image at a central viewpoint from among the multi-view depth images.

In the second depth image, a light colored portion indicates a portion having a great depth value or a portion closer to a point of capture. A relatively darker colored portion indicates a portion having a small depth value or a portion more remote from the point of capture.

Figure 11E:

FIG. 11E illustrates the third input color image according to some example embodiments.

Referring to FIG. 11E, the third input color image is a color image at a right side viewpoint or a far right side viewpoint from among the multi-view color images.

In the third input color image, circular objects in the foreground are illustrated to be leaning toward a left side. The greater a depth value of the objects in the foreground, or the closer to the point of capture, the closer the objects in the foreground to the left side.

Figure 11F:
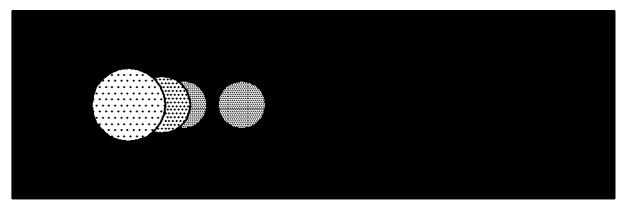

FIG. 11F illustrates the third input depth image according to some example embodiments.

Referring to FIG. 11F, the third input depth image is a depth image corresponding to the third input color image. The third input depth image is a depth image at a right side viewpoint or a far right side viewpoint from among the multi-view depth images.

In the third input depth image, a light colored portion indicates a portion having a great depth value or a portion closer to a point of capture. A relatively darker colored portion indicates a portion having a smaller depth value or a portion more remote from the point of capture.

FIGS. 12A through 12F illustrate three color images and three depth images of which a viewpoint is converted to a viewpoint of a base image according to some example embodiments.

Referring to FIGS. 12A through 12F, three color images whose viewpoints have been converted to a viewpoint of a base image and the three depth images whose viewpoints have been converted to a viewpoint of a base image are illustrated. The converted viewpoints may be viewpoints corresponding to the position determined by the position determiner 310.

The image converter 510 generates a color image with a converted viewpoint and a depth image with a converted viewpoint.

The position determiner 310 determines at least one position to be a position of a base image to be generated. The three color images with the converted viewpoints and the three depth images with the converted viewpoints as shown in FIGS. 12A through 12F are a viewpoint corresponding to a left side position or a far left side position from among three determined positions. For example, the viewpoint of the three color images with the converted viewpoints and the three depth images with the converted viewpoints as shown in FIGS. 12A through 12F is a viewpoint of a first base image.

A number of the generated color images with the converted viewpoints corresponds to a number of multi-view color images input. Also, a number of the generated depth images with the converted viewpoints corresponds to a number of multi-view depth images input.

Figure 12A:
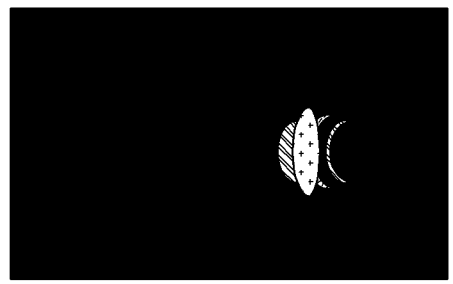
FIGS. 12A through 12F illustrate three color images and three depth images of which a viewpoint is converted into a viewpoint of a base image according to some example embodiments.
Figure 12B:
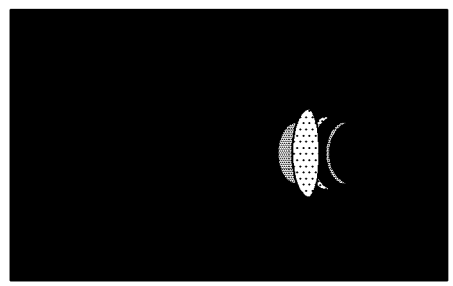
Figure 12C:
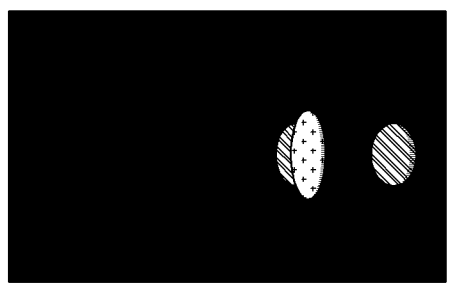
Figure 12D:
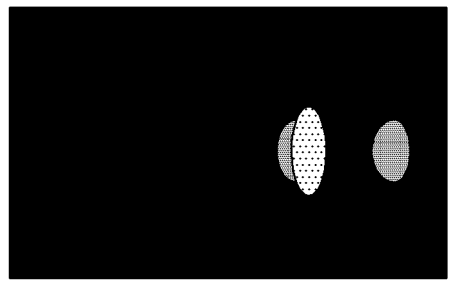
Figure 12E:
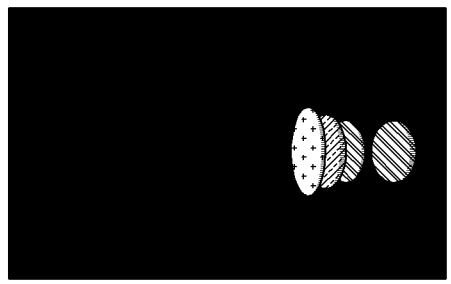

In FIG. 12A, FIG. 12C, and FIG. 12E, multi-view color images, for example, a first input color image, a second input color image, and a third input color image, are illustrated as color images of which a viewpoint is converted into a viewpoint of a base image.

FIG. 12A illustrates a first color image with a converted viewpoint according to some example embodiments.

The first color image with the converted viewpoint is an image generated by converting the viewpoint of the first input color image of FIG. 11A into the viewpoint of the base image.

A portion of objects in a foreground of the first input color image is occluded by another object in the foreground, and an occluded region is generated in the first color image with the converted viewpoint by the conversion of the viewpoints. The occluded region is indicated in black within the first color image with the converted viewpoint. Also, the occluded region is indicated in black in FIGS. 12B through 12F to be discussed later.

FIG. 12B illustrates a first depth image with a converted viewpoint according to some example embodiments.

The first depth image with the converted viewpoint is an image generated by converting the viewpoint of the first input depth image of FIG. 11B into the viewpoint of the base image.

A portion of objects in a foreground of the first input depth image is occluded by another object in the foreground, and an occluded region is generated in the first depth image with the converted viewpoint by the conversion of the viewpoints.

FIG. 12C illustrates a second color image with a converted viewpoint according to some example embodiments.

The second color image with the converted viewpoint is an image generated by converting the viewpoint of the second input color image of FIG. 11C into the viewpoint of the base image.

A portion of objects in a foreground of the second input color image is occluded by another object in the foreground, and an occluded region is generated in the second color image with the converted viewpoint by the conversion of the viewpoints.

FIG. 12D illustrates a second depth image with a converted viewpoint according to some example embodiments.

The second depth image with the converted viewpoint is an image generated by converting the viewpoint of the second input depth image of FIG. 11D into the viewpoint of the base image.

A portion of objects in a foreground of the second input depth image is occluded by another object in the foreground, and an occluded region is generated in the second depth image with the converted viewpoint by the conversion of the viewpoints.

FIG. 12E illustrates a third color image with a converted viewpoint according to some example embodiments.

The third color image with the converted viewpoint is an image generated by converting the viewpoint of the third input color image of FIG. 11E into the viewpoint of the base image.

A portion of objects in a foreground of the third input color image is occluded by another object in the foreground, and an occluded region is generated in the third color image with the converted viewpoint by the conversion of the viewpoints.

Figure 12F:
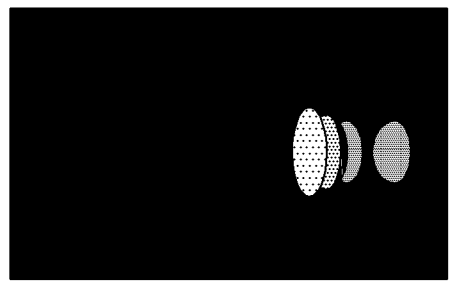

FIG. 12F illustrates a third depth image with a converted viewpoint according to some example embodiments.

The third depth image with the converted viewpoint is an image generated by converting the viewpoint of the third input depth image of FIG. 11F into the viewpoint of the base image.

A portion of objects in a foreground of the third input depth image is occluded by another object in the foreground, and an occluded region is generated in the third depth image with the converted viewpoint by the conversion of the viewpoints.

FIGS. 13A through 13F illustrate three base images according to some example embodiments.

As described above, the position determiner 310 determines at least one position to be a position of a base image to be generated. FIGS. 11A through 11F illustrate an instance in which three positions are determined to be the position of the base image, and base images corresponding to the three positions are generated.

In a perspective mode, the position determiner 310 determines the positions of the base images as positions corresponding to light sources at outermost edges and a light source at a center. Positions of a far left light source, a central light source, and a far right light source are determined to be the positions of the base images.

Figure 13A:
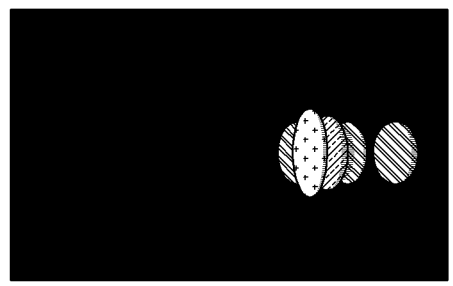
FIGS. 13A through 13F illustrate three base images according to some example embodiments.
Figure 13B:
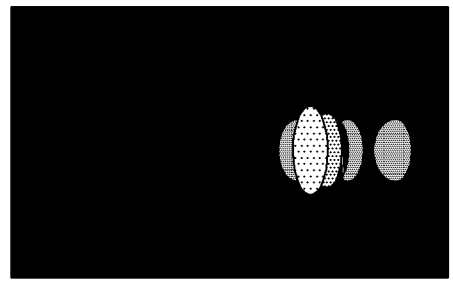

A first base image corresponding to a left position from among the three positions includes a first base color image in FIG. 13A and a second base depth image in FIG. 13B. A second base image corresponding to a center position includes a second base color image in FIG. 13C and a second base depth image in FIG. 13D. A third base image corresponding to a right position includes a third base color image in FIG. 13E and a third base depth image in FIG. 13F.

FIG. 13A illustrates a first base color image according to some example embodiments.

The first base color image represents a color of a first base image.

The image combiner 520 combines the first color image with the converted viewpoint in FIG. 12A, the second color image with the converted viewpoint in FIG. 12C, and the third color image with the converted viewpoint in FIG. 12E, and generates the first base color image.

FIG. 13B illustrates a first base depth image according to some example embodiments.

The first base depth image represents a depth of a first base image.

The image combiner 520 combines the first depth image converted with the converted viewpoint in FIG. 12B, the second depth image with the converted viewpoint in FIG. 12D, and the third depth image with the converted viewpoint in FIG. 12F, and generates the first base depth image.

Figure 13C:
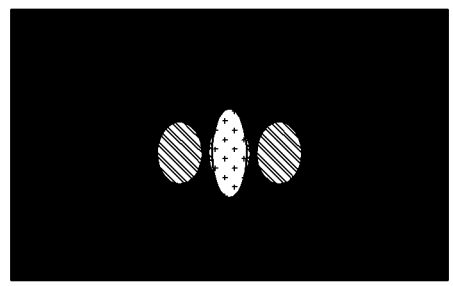

FIG. 13C illustrates a second base color image according to some example embodiments.

The second base color image represents a color of a second base image. The second base color image is generated by combining color images of which viewpoints are converted into a viewpoint of the second base image.

Figure 13D:
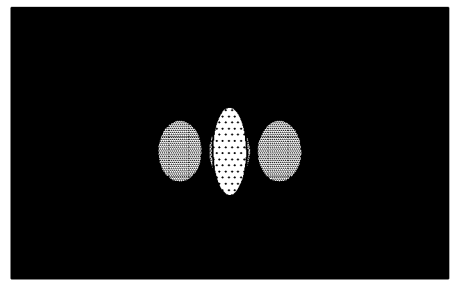

FIG. 13D illustrates a second base depth image according to some example embodiments.

The second base depth image represents a depth of a second base image. The second depth image is generated by combining depth images of which viewpoints are converted into a viewpoint of the second base image.

Figure 13E:
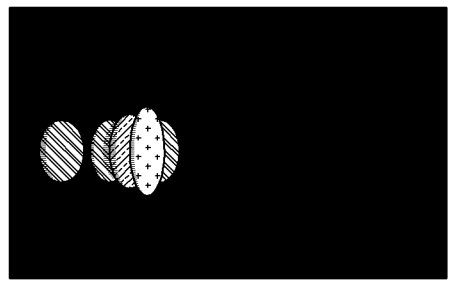

FIG. 13E illustrates a third base color image according to some example embodiments.

The third base color image represents a color of a third base image. The third base color image is generated by combining color images of which viewpoints are converted into a viewpoint of the third base image.

Figure 13F:
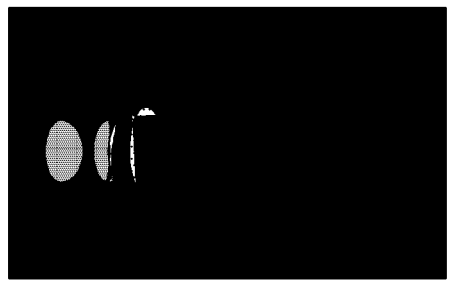

FIG. 13F illustrates a third base depth image according to some example embodiments.

The third base depth image represents a depth of a third base image. The third base depth image is generated by combining depth images of which viewpoints are converted into a viewpoint of the third base image.

Figure 14:
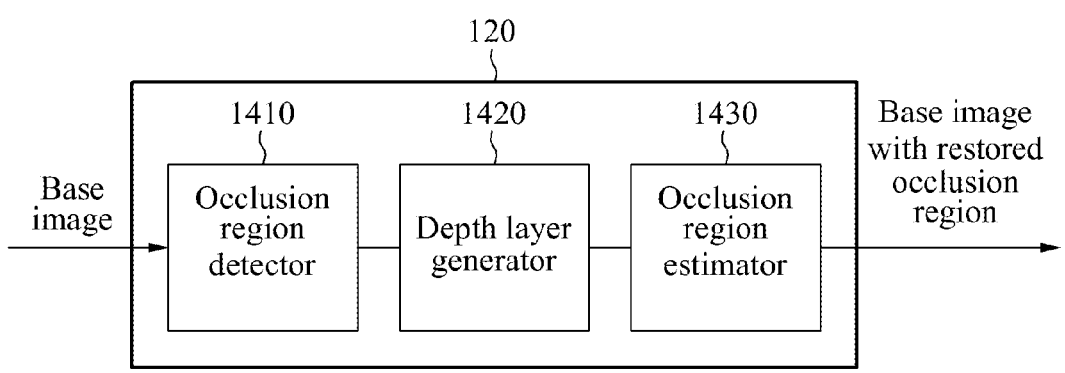
FIG. 14 illustrates an occlusion region restorer according to some example embodiments.
Figure 15:
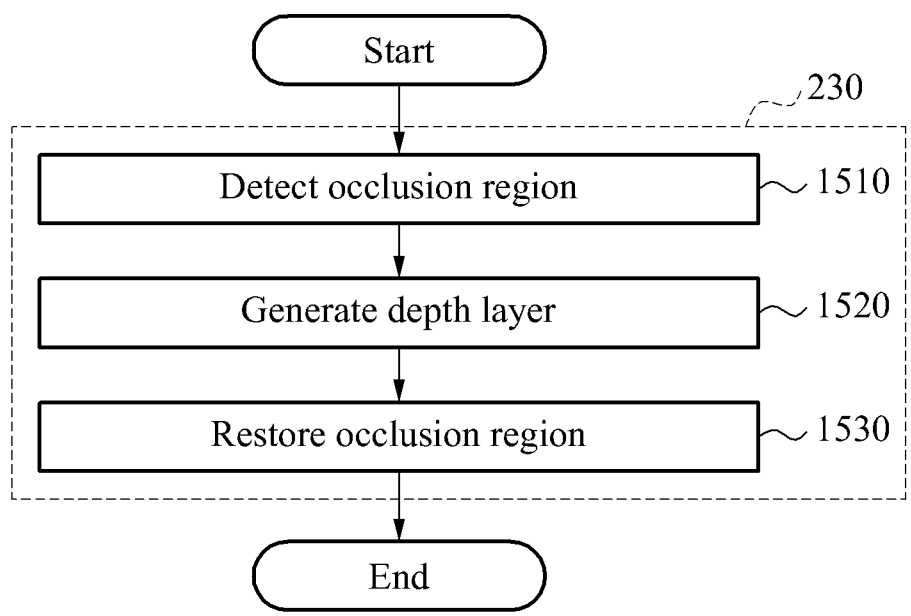
FIG. 15 illustrates a method of restoring an occlusion region according to some example embodiments.

FIG. 14 illustrates an occlusion region restorer according to some example embodiments. FIG. 15 illustrates a method of restoring an occlusion region according to some example embodiments.

Referring to FIGS. 1, 2, 14 and 15, as discussed with reference to FIG. 2, in operation 230, occlusion region restorer 120 restores an occlusion region.

The occlusion region restorer 120 includes an occlusion region detector 1410, a depth layer generator 1420, and an occlusion region estimator 1430.

A base image includes an occlusion region about which information is not provided in multi-view color images and depth images input.

The base image includes a greatest number of occlusion regions from among LF images to be generated by the apparatus 100 for image processing. Accordingly, when the occlusion region of the base image is restored, information about the restored region is used to generate another LF image.

In operation 1510, the occlusion region detector 1410 detects an occlusion region in a base image.

The base image is generated based on a plurality of images of which a viewpoint is converted. However, with respect to a viewpoint of the base image, a region in which information required for generation of the base image is not provided by any image from among the plurality of images of which the viewpoint is converted may exist. As used herein, the information includes a color value, and a depth value of a region or a pixel in the region. The occlusion region refers to a region, within the base image, lacking the information.

The occlusion region detector 1410 detects, as an occlusion region, pixels for which the color value, and depth value is not set from among pixels of the base image. The color value, and depth value of the pixels of the base image are set by mapping. A pixel to be mapped to a first pixel of a base color image is a closest pixel from among second pixels having a coordinate value identical to the first pixel of color images of which a viewpoint is converted. A pixel to be mapped to a third pixel of a base depth image is a closest pixel from among fourth pixels having a coordinate value identical to the third pixel of depth images of which a viewpoint is converted.

In operation 1520, the depth layer generator 1420 determines a depth layer with respect to the base image based on the base depth image of the base image. The depth layer generator 1420 groups pixels having an identical depth value or similar depth values into a single depth layer. As an example, the depth layer represents a region of the pixels having the identical depth value or similar depth values as a layer.

The depth layer generator 1420 splits the pixels of the base image into at least one layer. In the aforementioned splitting of the pixels, the depth layer generator 1420 groups the pixels having the identical depth value or the similar depth values into a single depth layer. For example, the at least one depth layer is obtained by splitting neighboring pixels having an identical depth value or similar depth values into layers.

As used herein, the similar depth values refer to depth values within a desired (or alternatively, a predetermined) range. A center of the range corresponds to an average value or a median value of pixels corresponding to a depth layer. The range may be a range appropriate for grouping into a single depth layer, and a range of depth values enabling a viewer to feel an identical sense of depth.

A depth value may not be determined with respect to an occlusion region or a pixel in an occlusion region within the base image. The depth layer generator 1420 selects a pixel having a smallest depth value from among pixels adjacent to the occlusion region, and determines a depth layer corresponding to the pixel to be a depth layer of the occlusion region. As an example, the adjacent pixels may be neighboring pixels in parallel with the occlusion region. Alternatively, with respect to the occlusion region, the depth layer generator 1420 selects a depth layer having a smallest depth value from among depth layers adjacent to the occlusion region, and includes the occlusion region in the selected depth layer. As an example, the adjacent depth layers may be neighboring depth layers in parallel with the occlusion region.

The selection of the depth layer including the occlusion region will be described with reference to FIGS. 16 and 17.

In operation 1530, the occlusion region estimator 1430 restores the occlusion region by estimating the occlusion region based on a depth layer to which the occlusion region belongs or a depth layer adjacent to the occlusion region from among at least one depth layer.

A plurality of depth layers adjacent to the occlusion region is provided. The occlusion region estimator 1430 uses a depth layer having a smallest depth value from among the plurality of depth layers to restore the occlusion region. As an example, the occlusion region estimator 1430 uses a depth layer selected based on a depth value from among the plurality of depth layers to restore the occlusion region.

The depth layer to which the occlusion region belongs or the depth layer adjacent to the occlusion region corresponds to pixels having a color value and a depth value.

Alternatively, the depth layer to which the occlusion region belongs or the depth layer adjacent to the occlusion region includes the pixels having the color value and the depth value. The occlusion region estimator 1430 restores the occlusion region by applying a texture synthesis method to the pixels having the color value and the depth value of the depth layer to which the occlusion region belongs. As an example, the occlusion region estimator 1430 expands color information and depth information of the pixels to the occlusion region by applying the texture synthesis method to the pixels having the color value and the depth value of the depth layer to which the occlusion region belongs.

The pixels having the color value and the depth value of the depth layer may represent objects of a scene. As an example, the occlusion region estimator 1430 restores information about an occlusion region generating a depth layer by applying the texture synthesis method to information about an object represented in a depth layer to which an occlusion region belongs. As used herein, the information includes a color value and a depth value.

Figure 16:
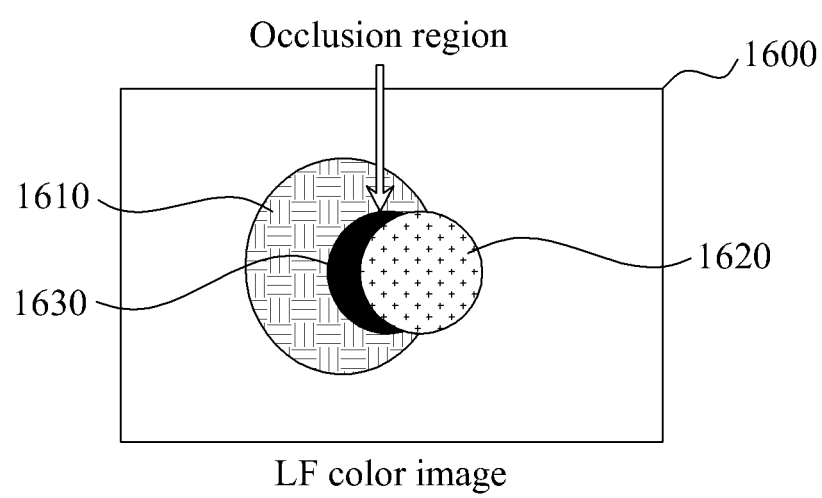
FIG. 16 illustrates a base color image according to some example embodiments.

FIG. 16 illustrates a base color image 1600 according to some example embodiments.

The base color image 1600 includes a first foreground region 1610, a second foreground region 1620, and an occlusion region 1630.

The occlusion region 1630 is indicated in black.

Figure 17:
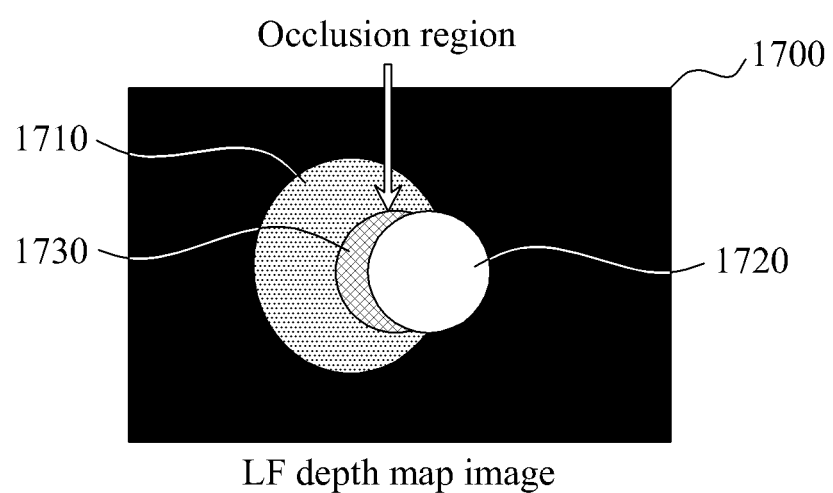
FIG. 17 illustrates a base depth image according to some example embodiments.

FIG. 17 illustrates a base depth image 1700 according to some example embodiments.

The base depth image 1700 refers to a depth image corresponding to the base color image 1600 of FIG. 16.

The base depth image 1700 includes a first foreground depth region 1710, a second foreground depth region 1720, and an occlusion region 1730.

The second foreground depth region 1720 is relatively protruded when compared to the first foreground depth region 1710. As an example, a depth value of the second foreground depth region 1720 may be greater than a depth value of the first foreground depth region 1710.

The depth layer generator 1420 determines a region of the first foreground depth region 1710 to be a first depth layer, and a region of the second foreground depth region 1720 is determined to be a second depth layer.

The first foreground depth region 1710 and the second foreground depth region 1720 are adjacent to the occlusion region 1730. The depth layer generator 1420 includes the occlusion region 1730 in the first depth layer 1710 having a smaller depth value from among the first depth layer 1710 and the second depth layer 1720.

When a plurality of depth layers is adjacent to the occlusion region, the plurality of depth layers includes a depth layer corresponding to a background and a depth layer corresponding to a foreground. The depth layer generator 1420 includes an occlusion region in the depth layer corresponding to the background from among the depth layer corresponding to the background and the depth layer corresponding to the foreground. Also, the depth layer generator 1420 includes an occlusion region in a depth layer having a smallest value from among a plurality of depth layers corresponding to the foreground.

Figure 18:
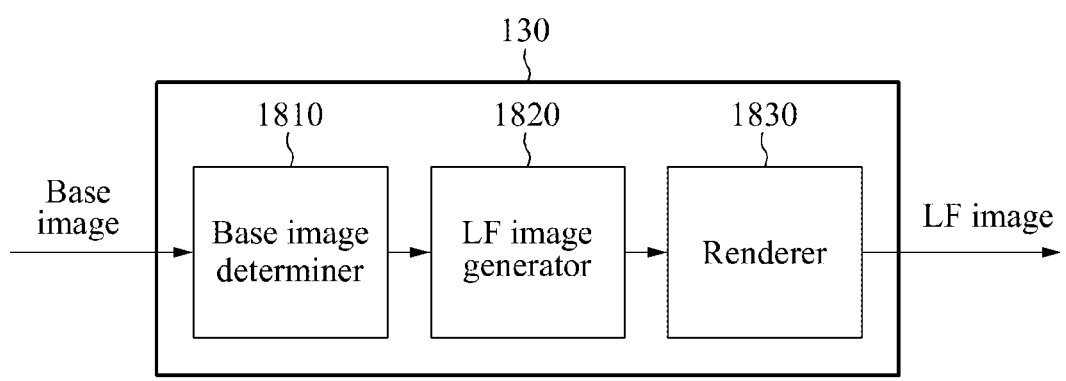
FIG. 18 illustrates a structure of an output image generator according to some example embodiments.
Figure 19:
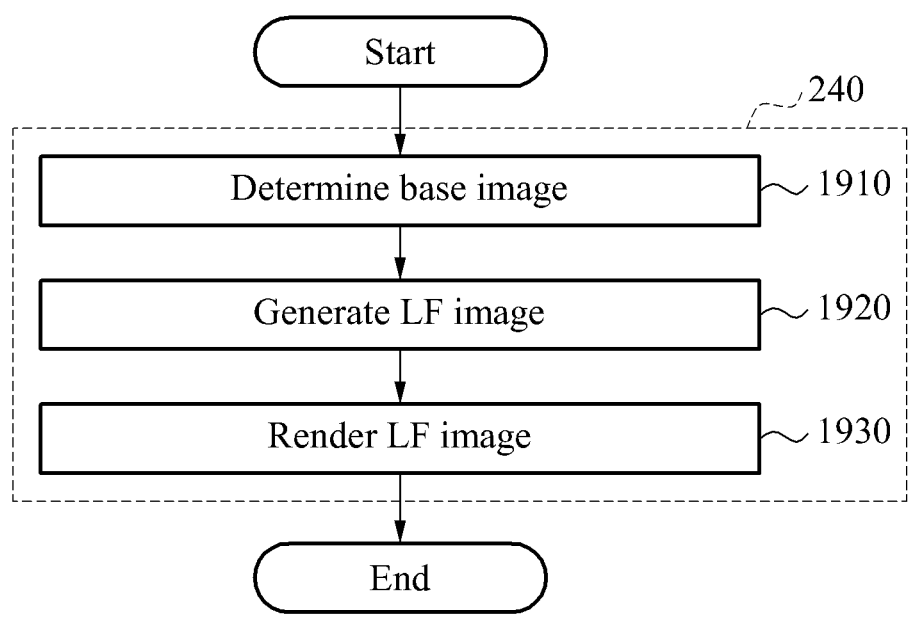
FIG. 19 illustrates a method of generating an output image according to some example embodiments.

FIG. 18 illustrates a structure of an output image generator according to some example embodiments. FIG. 19 illustrates a method of generating an output image according to some example embodiments.

Referring to FIGS. 1, 2, 18 and 19, as discussed with reference to FIG. 2, in operation 240, the output image generator 130 generates the output image. The output image generator 130 includes a base image determiner 1810, an LF image generator 1820, and a renderer 1830. In operation 1910, the base image determiner 1810 determines a base image to be used for generating an output image from among a plurality of generated base images. The base image determiner 1810 designates, as a main base image, the base image determined to be used for generating the output image from among the plurality of base images. Further, the base image determiner 1810 designates, as subsidiary base images, other base images aside from the determined base image from among the plurality of base images. As an example, the plurality of base images includes the main base image to be used for generating the output image.

The base image determiner 1810 determines a base image having a greatest occlusion region from among the plurality of generated base images to be the base image to be used for generating the output image. As an example, the base image determiner 1810 selects the base image to be used for generating the output image based on a size of the occlusion region from among the plurality of generated base images.

Also, the base image determiner 1810 determines, to be the base image to be used for generating the output image, a base image displaying a greatest occlusion region when a viewpoint of the base image is converted to a viewpoint of the output image from among the plurality of base images.

When an LF image, for example, an output image, is an image in a perspective method, the base image determiner 1810 determines a base image closest to a light source from among the plurality of base images to be the base image to be used for generating the output image. For example, the base image determiner 1810 determines a base image selected based on a distance from the light source from among the plurality of base images to be the base image to be used for generating the output image.

When an LF image, for example, an output image, is an image in an orthographic method, the base image determiner 1810 calculates a difference between a first angle and a second angle. The first angle refers to an angle of an inclination of a base image. The second angle refers to an angle between a normal vector of a display and a ray, in which the output image is output. The base image determiner 1810 determines a base image that minimizes the difference between the first angle and the second angle from among the plurality of generated base images to be the base image to be used for generating the output image. As an example, the determined base image refers to a base image having the first angle closest to the second angle from among the plurality of base images. Alternatively, the determined base image refers to a base image selected based on the second angle and the first angle from among the plurality of base images.

In operation 1920, the LF image generator 1920 generates LF images, for example, an output image, based on the base image determined in operation 1910. A viewpoint of the LF image and a viewpoint of the base image may differ from each other. The LF image generator 1920 generates an LF image based on a base color image and a base depth image of the base image determined in operation 1910.

The LF image generator 1920 generates the LF image by applying view interpolation to the determined base image.

In operation 1930, the renderer 1830 renders an occlusion region within the LF image, for example, an output image, generated based on other base images aside from the determined base image from among the plurality of base images. The renderer 1830 renders the occlusion region within the LF image generated based on 1) information about a color value of base color images of subsidiary base images and 2) information about a depth value of base depth images of subsidiary base images. As an example, to render the occlusion region within the LF image, information about the other base images aside from the base image used to generate the LF image from among the plurality of base images is used. Information about base images includes information about color values of base color images included by base images and information about depth values of base depth images included by base images.

The base image selected in operation 1910 refers to an image including a greatest occlusion region. Accordingly, LF images generated based on other base images aside from a base image selected from among base images may not include a new occlusion region or an additional occlusion region. Thus, the renderer 1830 may not use an additional method of restoring an occlusion region.

As described above, output images are generated by applying view interpolation to a base image. Accordingly, the output image generator 130 generates an output image by performing shift operation on pixels of a base image. Also, the output image generator 130 uses an integrated single occlusion region in generation of output images. Accordingly, consistency amongst the output images may be achieved in restoration of the occlusion region.

Figure 20A:
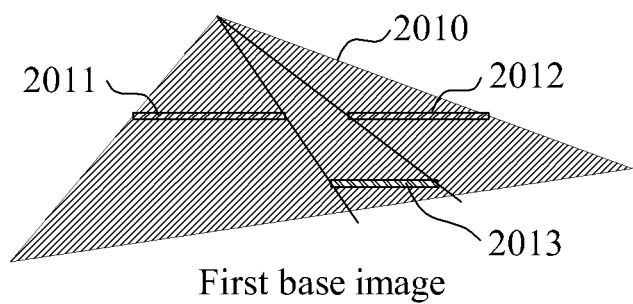
FIG. 20A illustrates a first base image according to some example embodiments.

FIG. 20A illustrates a first base image 2010 according to some example embodiments.

The first base image 2010 of FIG. 20A refers to a base image when an output image is displayed by perspective projection. The first base image 2010 refers to a base image when the output generator 130 or a display is a perspective type of an apparatus.

In FIG. 20A, the first base image 2010 includes two objects in a foreground. A first object is indicated as a region 2011 and a region 2012. A second object is indicated as a region 2013. The second object is an object relatively protruded, and the first object is an object disposed relatively in a rear.

Figure 20B:
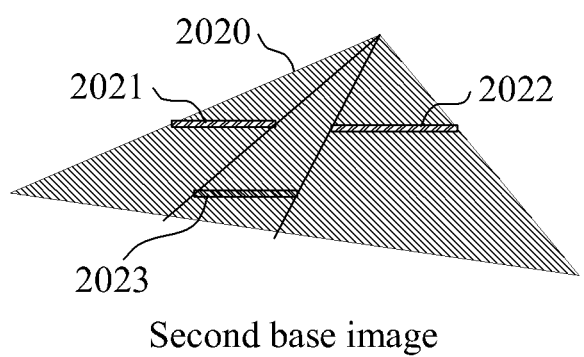
FIG. 20B illustrates a second base image according to some example embodiments.

FIG. 20B illustrates a second base image 2020 according to some example embodiments.

The second base image 2020 of FIG. 20B refers to a base image when an output image is displayed by a perspective projection. The second base image 2020 refers to a base image when the output generator 130 or a display is a perspective type of an apparatus.

The first base image 2010 and the second base image 2020 have differing viewpoints.

As described in FIGS. 20A and 20B, occlusion regions in the first base image 2010 and the second base image 2020 may differ from one another.

Figure 20C:
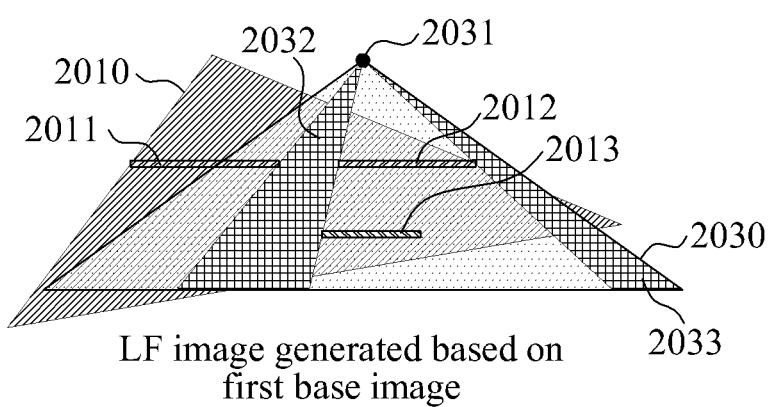
FIG. 20C illustrates an LF image generated based on a first base image according to some example embodiments.

FIG. 20C illustrates an LF image 2030 generated based on a first base image 2010 according to some example embodiments.

The LF image 2030 generated based on the first base image 2010 includes occlusion regions 2032 and 2033.

The first base image 2010 includes two objects in a foreground. A first object is indicated as the region 2011 and the region 2012. A second object is indicated as the region 2013.

A point 2031 corresponds to a viewpoint or an output point of the LF image 2030.

Figure 20D:
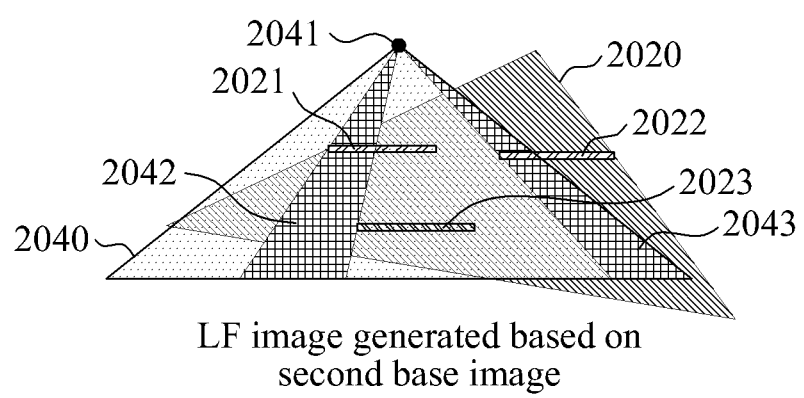
FIG. 20D illustrates an LF image generated based on a second base image according to some example embodiments.

FIG. 20D illustrates an LF image 2040 generated based on a second base image 2020 according to some example embodiments.

The LF image 2040 generated based on the second base image 2020 includes occlusion regions 2042 and 2043.

A point 2041 corresponds to a viewpoint or an output point of the LF image 2040.

As shown in FIGS. 20C and 20D, the occlusion regions of the LF images generated based on differing base images differ from one another.

As an example, when the first base image 2010 is determined to be a main base image, the occlusion regions 2032 and 2033 exist in the LF image 2030 generated based on the first base image 2010. Information about the occlusion regions 2032 and 2033 is obtained from other base images, such as the second base image 2020.

Figure 21A:
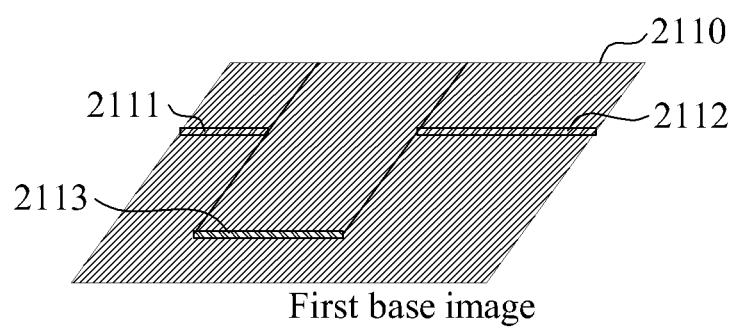
FIG. 21A illustrates a first base image according to some example embodiments.

FIG. 21A illustrates a first base image 2110 according to some example embodiments.

Referring to FIG. 21A, the first base image 2110 refers to a base image when an output image is displayed by an orthographic projection. The first base image 2110 refers to a base image when the output generator 130 or a display is an orthographic type of an apparatus.

In FIG. 21A, the first base image 2110 includes two objects in a foreground, namely a first object in a region 2111 and a region 2112. A second object is indicated as a region 2113. The second object is an object relatively protruded, and the first object is an object disposed relatively in a rear.

Figure 21B:
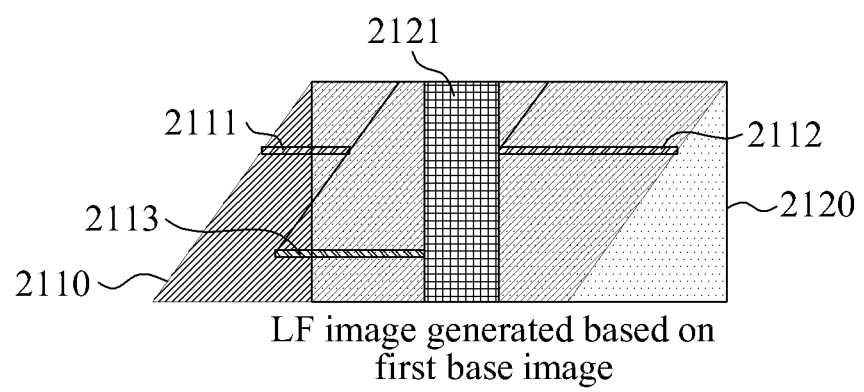
FIG. 21B illustrates an LF image generated based on a first base image according to some example embodiments.

FIG. 21B illustrates an LF image 2120 generated based on a first base image 2110 according to example embodiment.

Referring to FIG. 21B, the LF image 2120 generated based on the first base image 2110 includes an occlusion region 2121.

Figure 21C:
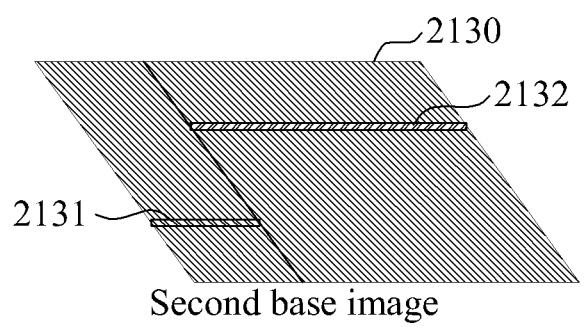
FIG. 21C illustrates a second base image according to some example embodiments.

FIG. 21C illustrates a second base image 2130 according to some example embodiments.

Referring to FIG. 21C, the second base image 2130 refers to a base image when an output image is displayed by an orthographic projection. The second base image 2130 refers to a base image when the output generator 130 or a display is an orthographic type of an apparatus.

The second base image 2130 also includes two objects in a foreground. A first object is indicated as a region 2131 and a second object is indicated as a region 2132.

The first base image 2110 and the second base image 2130 have differing viewpoints.

Figure 21D:
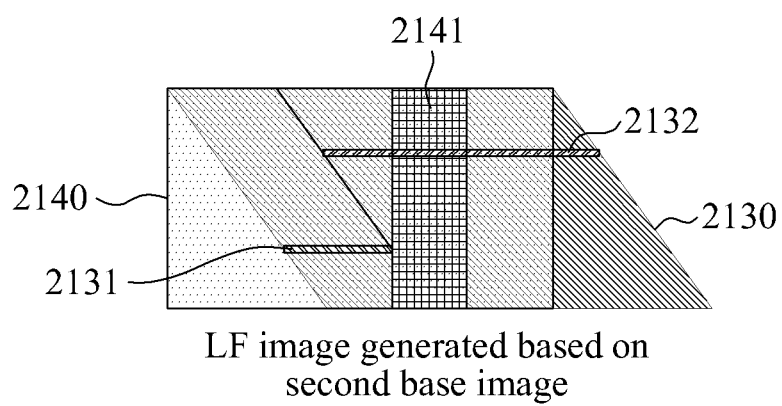
FIG. 21D illustrates an LF image generated based on a second base image according to some example embodiments.

FIG. 21D illustrates an LF image 2140 generated based on a second base image 2130 according to some example embodiments.

Referring to FIG. 21D, the LF image 2140 generated based on the second base image 2130 includes an occlusion region 2141.

As described in FIGS. 21B and 21D, occlusion regions of LF images generated based on differing base images differ from one another.

When a first object is relatively protruded, and a second object is disposed relatively in a rear, occlusion regions of the first base image 2110 and the second base image 2130 may differ from one another. As illustrated in FIG. 21B, a new LF image such as the LF image 2120 is generated based on a base depth image of the first base image 2110. Also, as illustrated in FIG. 21D, a new LF image such as the LF image 2140 is generated based on a base depth image of the second base image 2130.

A portable device may include mobile communication devices, such as a personal digital cellular (PDC) phone, a personal communication service (PCS) phone, a personal handy-phone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method for image processing according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape: optical media such as CD ROM discs and DVDs: magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A method for image processing, the method comprising:
   generating a plurality of base images based on multi-view color images and depth images corresponding to the multi-view color images, each of the plurality of base images including first occlusion regions;
   selecting one of the plurality of base images as a main base image based on a size of the first occlusion regions associated with each of the plurality of base images such that the main base image has a largest total first occlusion region among the first occlusion regions included in the plurality of base images;
   restoring one or more of the first occlusion regions in the main base image; and
   generating light field (LF) images by,
     applying view interpolation to the main base image to generate the LF images such that a viewpoint of the LF images and a viewpoint of the main base image differ, and
     rendering a second occlusion region in the LF images based on other ones of the plurality of base images.

2. The method of claim 1, wherein the base image is determined based on an inclusion relationship of the second occlusion regions of the LF images to be generated.

3. The method of claim 1, wherein
   the plurality of base images corresponds to at least a far left image and a far right image.

4. The method of claim 1, wherein the base image is selected based on directions of rays of the LF images.

5. The method of claim 1, wherein the generating a base image comprises:
   determining a position of the base image based on the first occlusion regions; and
   generating the base image of the determined position based on the multi-view color images and the depth images.

6. The method of claim 5, wherein the generating a base image comprises:
   generating converted images by converting the multi-view color images and the depth images into an image of a viewpoint at the determined position; and
   generating the base image of the determined position by combining the converted images.

7. The method of claim 6, further comprising:
   selecting a pixel based on a depth value, from among pixels of the converted images, and wherein the generating a base images generates the base image using data from the selected pixel as data for a plurality of pixels.

8. The method of claim 1, wherein the restoring of the first occlusion regions in the base image comprises:
   detecting the first occlusion regions in the base image;
   generating at least one depth layer with respect to the base image based on a base depth image, the base depth image representing a depth of the base image; and
   restoring the first occlusion regions based on one of the at least one depth layer that is adjacent to the first occlusion regions.

9. The method of claim 8, wherein a plurality of depth layers adjacent to the first occlusion regions are generated, and
   the restoring restores the first occlusion regions based on one of the at least one depth layers from among the plurality of adjacent depth layers.

10. The method of claim 8, wherein the first occlusion regions are restored through texture synthesis with respect to the depth layer in which the first occlusion regions are included.

11. The method of claim 1, wherein the generating a base image includes generating a plurality of base images, and
    the plurality of base images include a main base image used for generating the LF images.

12. The method of claim 11, wherein the main base image is a base image selected based on a size of the first occlusion regions from among the plurality of base images.

13. The method of claim 11, wherein the main base image is a base image selected from among the plurality of base images based on a distance from a light source.

14. The method of claim 11, wherein the main base image is a base image selected from among the plurality of base images based on a second angle and a first angle,
    the first angle is an angle of an inclination of the base image, and
    the second angle is an angle between a normal vector of a display via which the LF images is outputted and a ray.

15. The method of claim 11, wherein the generating the LF images comprises:
    determining the main base image;
    generating the LF images based on the determined main base image; and
    rendering the second occlusion region in the LF images based on other ones of the plurality of base images other than the main base image.

16. A non-transitory computer-readable recording medium storing a program for instructing a processor to perform the method of claim 1.

17. An image processing apparatus comprising:
    a processor including,
       a base image generator configured to generate a plurality of base images based on multi-view color images and depth images corresponding to the multi-view color images, each of the plurality of base images including first occlusion regions,
       a selector configured to select one of the plurality of base images as a main base image based on a size of the first occlusion regions associated with each of the plurality of base images such that the main base image has a largest total first occlusion region among the first occlusion regions included in the plurality of base images,
       an occlusion region restorer configured to restore the first occlusion regions in the main base image, and
       an LF image generator configured to generate the LF images by,
          applying view interpolation to the main base image to generate the LF images such that a viewpoint of the LF images and a viewpoint of the main base image differ, and
          rendering a second occlusion region in the LF images based on other ones of the plurality of base images.

18. A method of generating LF images using a processor, the LF images being four-dimensional images, the method comprising:
    combining, by the processor, a plurality of input images into a main light field (LF) base image based on a depth image, the main LF base image being selected among a plurality of LF base images based on a size of first occlusion regions associated with each of the plurality of LF base images such that the main LF base image has a largest total first occlusion region among the first occlusion regions included in the plurality of LF base images;
    detecting, by the processor, the first occlusion regions associated with the main LF base image;
    forming, by the processor, a restored main LF base image by restoring pixel values in the first occlusion regions of the main LF base image based on a depth of the first occlusion regions; and
    generating, by the processor, the LF images by
       applying view interpolation to the restored main LF base image to generate the LF images such that a viewpoint of the LF images and a viewpoint of the restored main LF base image differ, and
       rendering a second occlusion region in the LF images based on other ones of the plurality of LF base images.

* * * * *